May 5, 1936.　　　　P. H. ROBERTS　　　　2,039,662
AUTOMATIC VALVE CONTROL
Filed Aug. 9, 1933　　　2 Sheets-Sheet 1
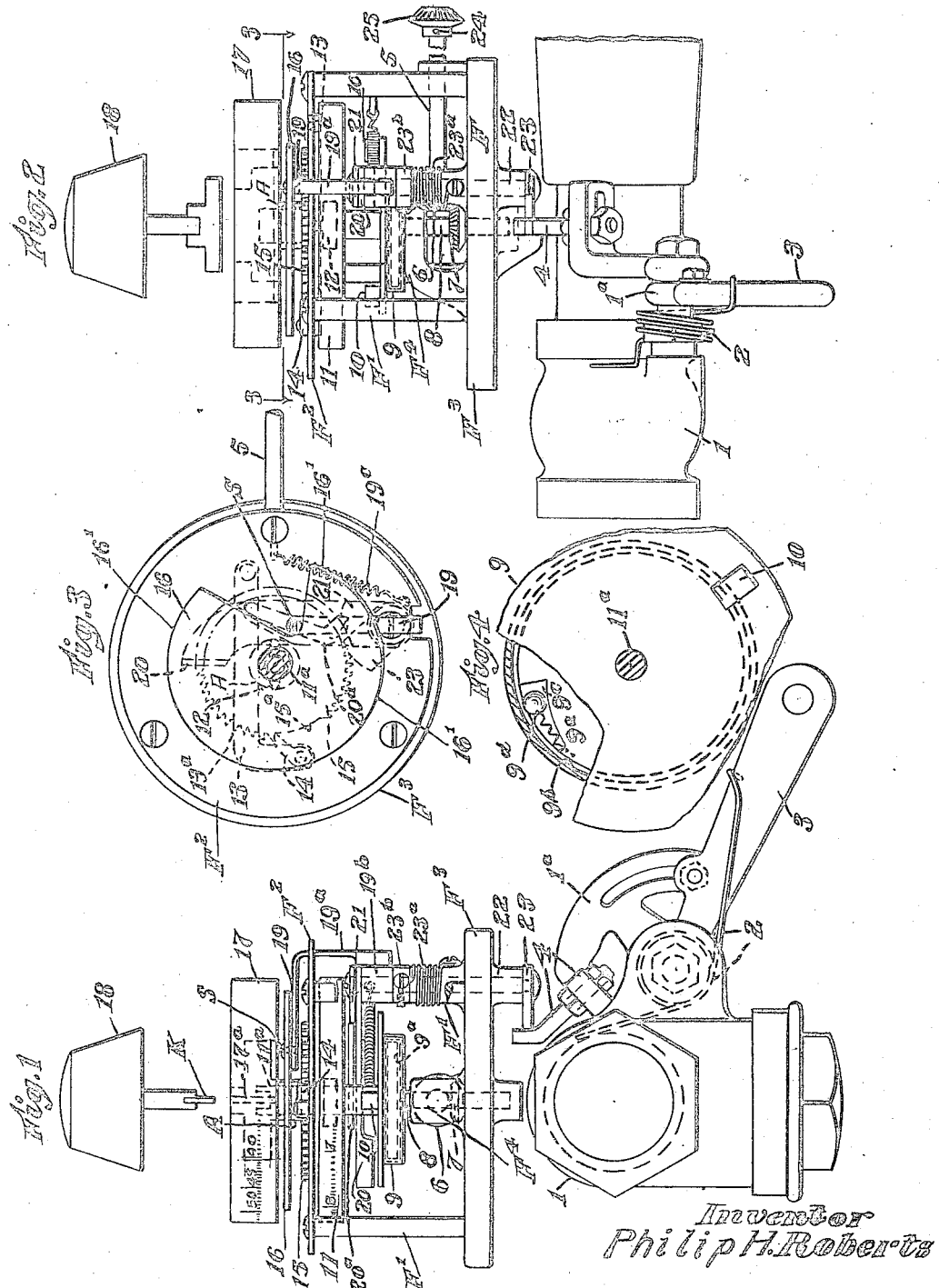
Inventor
Philip H. Roberts
By
Attorney

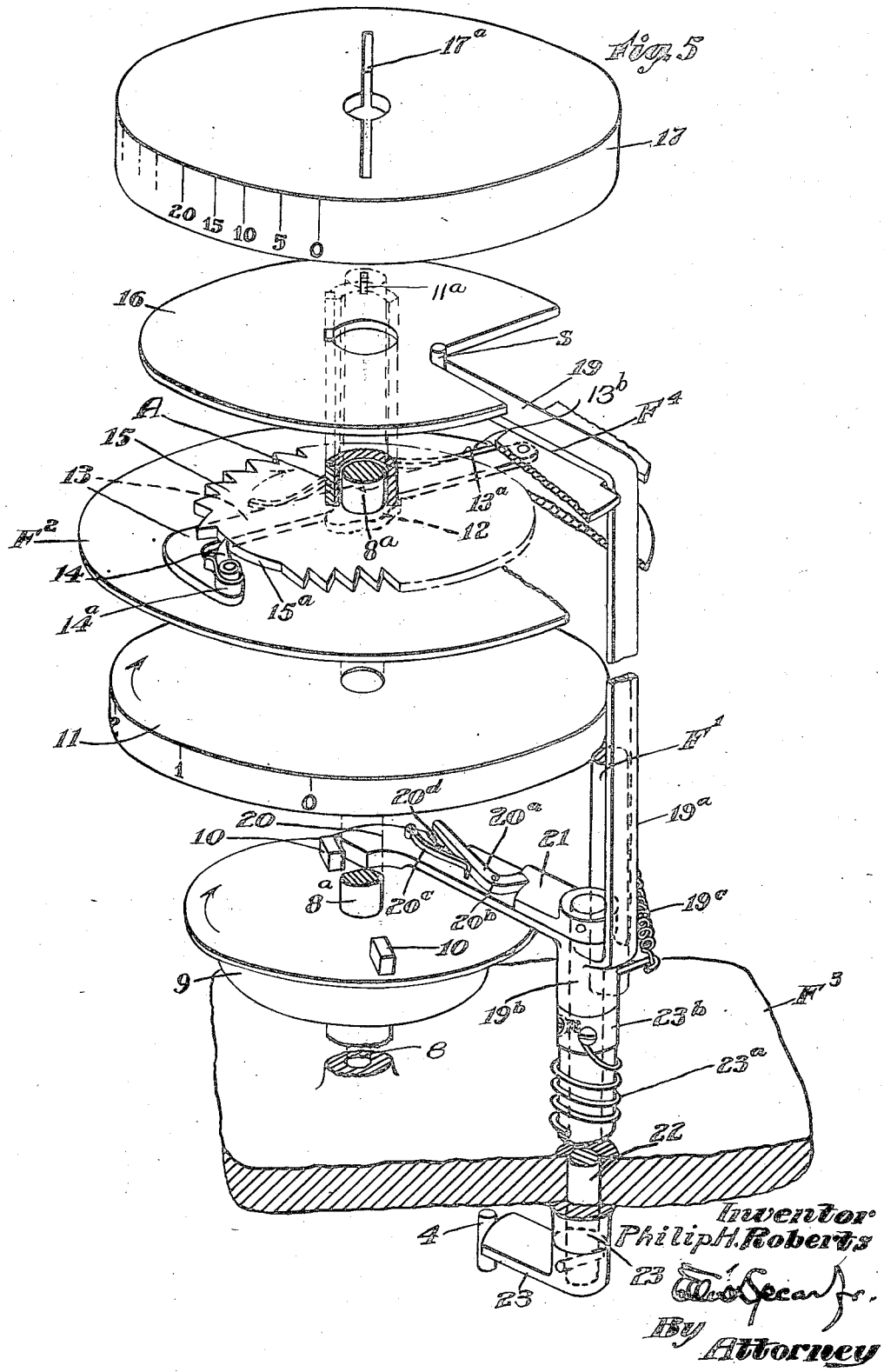

Patented May 5, 1936

2,039,662

UNITED STATES PATENT OFFICE 2,039,662

AUTOMATIC VALVE CONTROL

Philip H. Roberts, Medford, Mass.

Application August 9, 1933, Serial No. 684,344

9 Claims. (Cl. 221—101)

My invention relates to improvements in automatic valve controls adapted to close the valve after a predetermined quantity of fluid has been delivered.

Delivery systems, whether gravity or pressure feed, from trucks, tanks, or other storage units are generally equipped with meters so that the amount of fluid delivered may be determined, and efforts have been made to provide suitable stop mechanisms so that after a predetermined amount of liquid or liquids has been dispensed the delivery valve will be automatically closed.

The problems dealt with by my present invention, are illustrated in connection with deliveries from trucks to storage tanks which may be positioned at some distance from the trucks, as, for instance, in the delivery of fuel oil and gasolene. Suitable meters have been provided that register accurately the amount of fluid dispensed, but a suitable automatic cut-off to meet practical conditions does not exist.

In such deliveries of fluid, a major problem has been to avoid the overflows which may well result if the amount actually delivered is in excess of actual tank capacity. To avoid the possibility of overflow, and the untidy and dangerous conditions resulting, it heretofore has been found necessary to employ two operators, one controlling fluid flow at the meter and the other at the point of delivery where a manually controlled valve may be closed if desired. While this may relieve the operator or his employer from liability or expense resulting from overflow, the added expense is excessive.

Stop mechanisms have been devised but none of these were adapted to overcome these conditions because of the common fault that the readjustment of the system was not possible because of the positive relation of the stop mechanism to the meter. In such systems the difference between the set amount and the amount actually delivered would affect subsequent deliveries as the set dials on such devices were not adjustable independently of the driving connection from the meter. The result was that if the valve were closed before the predetermined quantity had been dispensed, the difference, perhaps fractional amounts, would have to be calculated in making the next setting, permitting frequent and expensive errors. The other alternative was to let the fluid pass back into the reservoir or tank which would obviously render meter reading inaccurate.

The above problem has been solved and the difficulties of the prior art overcome in general by employing a one way clutch interposed in the drive connection for the dial operating mechanism, the same being of such nature that when fluid is being delivered, the mechanism will be operated by the driving connection from the meter, but which on reverse movement will not be influenced by the driving mechanism.

My invention involves a plurality of dials adapted to function either separately or in cooperation with each other, one dial being adapted to register relatively small amounts and the other relatively large amounts. I provide means to permit selective manual resetting or adjustment of either one or both of the dials independently of the meter and of the driving connection therefrom. I contemplate a simplified valve control that will permit the dials to be readjusted independently of the meter so that there will be no interference with future contemplated delivery, and thus ensure positive control of desired quantities ascertainable with meter accuracy.

A further feature of my invention is the accuracy with which the flow of liquid is cut off. With previous devices, the valve release was controlled by a single dial. Wholly accurate dial adjustment was difficult and in large capacity devices the inevitable inaccuracy of delivery was very serious because slight movement of the dial represented appreciable volumes of fluid. Since most meters are equipped with conspicuous registering dials, the inaccuracy in the cut-off was obvious.

To overcome this objection, I utilize a secondary mechanism rotated from the meter, each revolution of which represents the passage of relatively small volumes of fluid which may be indicated on a secondary dial which if desired may be included in the mechanism. This mechanism may be readily checked with the meter dials to determine its accuracy. A ratio of rotation may be determined with respect to the main dial. The main dial prevents the release of the valve until the volume of fluid remaining to be discharged is of an amount less than one complete or partial revolution, as desired, of the secondary mechanism. Only when the amount of fluid remaining to be discharged is a volume controlled by the secondary mechanism is the valve release mechanism in position to be actuated. This is effected by means of connections made between this secondary mechanism and the valve release mechanism at some predetermined point in the rotation of the secondary mechanism. This secondary mechanism includes a member which carries the valve release mechanism to a point where cut-off is effected. Thus the actual release of the valve is accomplished during a slight but predetermined and definite movement of this secondary mechanism and thus the desired accuracy of cut-off is ensured. The secondary mechanism may be adapted to represent a single unit, multiple units or fractions of units of fluid flow. With the use of one or more properly adjusted dials of definite ratio of rotation, large units of fluid may pass through the system without in any way detracting from the accuracy of cut-off which is wholly governed by the secondary meter driven mechanism which actually determines the point of cut-off, which secondary meter independently of the main dial may be made to effect valve closing accurately on the basis of any desired unit.

As with prior devices, I provide the old well known hand control so that the spring controlled valve may be opened when desired and manually controlled when operating conditions demand it.

My invention has the further advantage of being adapted to installation in any mechanism where conditions are found to require some positive automatic control of the fluid delivery system as above indicated. Other advantages will be readily apparent from the complete description of the specification.

In the drawings I have shown and in the specification described one preferred embodiment of my invention. Throughout specification and drawings like reference numerals are employed to indicate corresponding parts.

In the drawings:

Fig. 1 is an elevation of my valve control mechanism.

Fig. 2 is a side elevation of Fig. 1.

Fig. 3 is a cross section on the line 3—3 of Fig. 2, and

Fig. 4 is a fragmentary sectional view partly broken away of a form of one-way clutch.

Fig. 5 is a fragmentary view partly in section of the valve releasing mechanism.

In a system as above referred to, I provide in a fluid feed line a valve 1 normally held closed by the spring 2. The valve 1 is controlled by the handle 3 which has an arm 4 adapted to be engaged and held by my control device when the same is set for the delivery of some desired quantity of fluid. The valve 1 is always manually opened and it may be manually closed, but if the estimated flow of fluid is correct my device will close the valve automatically.

My device is supported by a frame consisting of spaced vertical members F', a top plate F² and a bottom plate F³.

My invention involves several operations and the mechanisms effecting the same. These may briefly be summarized as, first, indicating dial adjustment so that the system is set to permit the passage of a predetermined amount of fluid through the valve; second, the maintenance of the valve in open position during the passage of the indicated amount of fluid therethrough; third, the automatic cut-off when the indicated amount has passed; and, fourth, the readjustment of the indicating dials, regardless of whether or not the set amount of fluid has actually passed through the valve. This last operation is involved in cases where the manual cut-off has been used to prevent over-flow when the amount indicated on the dials was in excess of what the tank could hold.

As above suggested, I provide a main dial or main mechanism which may be set to permit the passage of some predetermined volume of fluid. In practice this dial usually indicates volumes in multiples of five, and if desired, additional properly adjusted and controlled mechanisms and dials may be provided to permit the passage of still larger volumes. To avoid inaccurate delivery of fluid by a valve when controlled by these dials, I provide my secondary mechanism which controls and effects the actual cut-off. This may include a dial which will indicate the number of units of fluid that will pass through the meter during one complete revolution of the secondary mechanism which is really one revolution of the meter driven shaft 8. A proper ratio of rotation is maintained between the revolutions of the secondary mechanism and the main mechanism as hereinafter to be described.

As indicated, my system comprises two indicating dials, one registering in multiples of five and the other from one to ten. These dials may be adjusted independently of each other and of the meter drive, by disconnecting the cut-off mechanism from the meter and rotating it in reverse direction are therefore absolutely accurate.

The main drive for my mechanism includes a meter driving shaft (not shown) to which is geared a shaft 5 which enters the casing (not shown) and through the gears 6 and 7 rotates the main shaft 8. The shaft 8 is supported at one end in the frame member F³ and by a supporting bracket F⁴. The shaft 8 carries my secondary mechanism including a one-way clutch 9 or other member adapted to be rotated by the shaft during its rotation in one direction only.

The clutch 9 (Fig. 4) may be of any desired form, as a member 9a on the shaft 8 and a member 9b enclosing the member 9a. The member 9a is provided with recesses 9c in which are positioned the engaging means 9d which interlock the members 9a and 9b on rotation in one direction only.

The member 9b has upturned portions or studs 10 and carries the shaft 8a on which is mounted the indicating dial 11 which, as above stated, must register with meter accuracy, and because of its simple and positive connection with the meter driving shaft, it is impossible for its efficiency and accuracy to be impaired.

The one-way clutch 9 also permits the dials 11 and 17 to be reset as hereinafter described without affecting the driving connection 8, which obviously would destroy meter accuracy and strain the mechanism.

To rotate the main dial 17 at reduced speed in order that it may indicate multiple units of fluid flow say for example in multiples of five, I provide cam portions 12 fixed on the shaft 8a which on every half rotation of the dial 11 actuate the lever 13 which is pivoted to the frame work F⁴ as at 13b. The lever 13 has a pawl 14 adapted to move the ratchet member 15. The lever 13 and pawl 14 are provided with springs 13a and 14a. The spring 13a is secured to the plate F² as at 13b. A collar A is freely mounted for rotation on the shaft 8. On this collar are secured the ratchet 15, cam 16, and main dial 17, all of which rotate as a unit on engagement of the pawl 14 with the ratchet 15.

The dial 11 may be designed to register from zero to ten. Each complete rotation of the shaft 8a will cause the cam portions 12 to move the lever 13 twice, and accordingly the ratchet member 15 will be moved two tooth spaces and carries with it the cam member 16 and dial 17. The dial 17 may therefore be conveniently marked to register in fives, and, as the dials may be independently adjusted my device may be accurately set to any desired amount.

The dial setting knob 18 is adapted to turn the dial 17 by insertion of the key portion K in the slot 17a. By further depression of the knob 18 the slot 11a of the shaft 8a is engaged by the key K so that the dial 11 may be adjusted independently of the dial 17.

The mechanism permitting the valve 1 to close involves also a consideration of dial adjusting operations.

In a manner to be later described, when the dials are adjusted the latch or catch 23 is in a position to hold the arm 4.

A lever 19 having a bent portion 19a is pivoted to the collar 19b for movement about the cut-off shaft 22. The lever 19 has a stud S adapted to ride on the cam 16. Movable with the lever 19 on the collar 19b is a clutch engaging arm 20 subjected to the counter-clockwise influence of the spring 19c which tends to maintain the stud S in contact with the cam face 16' until all the fluid to be discharged has passed through the meter except an amount less than that accounted for by the predetermined movement of the secondary mechanism as indicated on the dial 11. At this point, the spring 19c causes the stud S to drop from the perimeter of the cam to the position indicated in Fig. 3 permitting the otherwise undetermined balance to be accurately checked by the dial 11 and clutch 9 to deliver the full predetermined quantity of fluid.

In the embodiment of my invention shown in the drawings, the clutch 9 is provided with two studs 10. This means that only the amount of fluid which would pass during a semi-revolution of the meter shaft could be discharged before the cut-off would be effected. In the illustrated case, this would be five gallons. Obviously the studs may be positioned to provide for other units. If a single stud were used, a greater volume could pass before valve release than if two or more studs were used. There is obviously a direct relation between this mechanism and the meter adjustment. The present disclosure is merely illustrative of one adjustment of my apparatus.

When the dials are adjusted the stud S is carried from its position as shown in Fig. 3 to the perimeter or cam surface of the cam member 16, its exact position being determined by the number of fluid units as indicated by the initial setting of the dial 17 which moves the cam 16 and ratchet 15 to corresponding positions. When the lever 19 is in operating position with the lever stud S on the perimeter of the cam, the clutch engaging arm 20 is held outside of the path of the clutch studs 10.

The ratchet 15 is without teeth throughout a portion of its surface as at 15a so that until the dial 17 is adjusted, rotation of the shaft will not influence the dial because the pawl 14 will travel on the toothless portion of the ratchet.

The automatic valve release is effected in the following way. When the dial 17 has rotated from the set amount to zero, the lever 19 and arm 20 are carried by the spring 19c to the position shown in Fig. 3 and Fig. 5.

The arm 20 is then in position to be contacted by the studs 10 on the clutch, but actual contact is delayed until the remaining units of undelivered fluid have passed through the meter. The actual contact occurs at some predetermined point or when only some definite volume remains to be delivered. That is the contact of the clutch stud 10 and arm 20 may be made when one gallon remains to be delivered, and when this amount has passed the cut off will have been carried by the rotation of the clutch to valve release position.

It is desirable that there be a period between the point when the valve release mechanism 19—20 is released by the cam 16 to operative position, and the point when the stud 10 actually contacts the arm 20. During this period the positive meter controlled rotation of the clutch rectifies any inaccuracy in the main dial or setting as the closing of the valve 4 is affected by mechanism rotating with the shaft 8a. Also it will permit the passage of definite desired smaller volumes than could be secured with the main dial, as for example, in the illustrated apparatus, the delivery of such an amount as three gallons.

In order that the secondary mechanism or clutch may effectively actuate the valve release mechanism, it may deliberately be provided that the stud S enter the cam pocket 16 before the entire amount indicated has passed through the meter. This should leave to be delivered by the secondary mechanism such an amount as would still permit ample margin for correction of inaccuracy in the main dial or setting, and of course must be an amount less than that represented by the predetermined clutch movement, whether a whole or partial revolution.

During this period the arm 20 is free to be contacted by the clutch studs 10. The point of valve release thus may be made very accurate, that is, a definite movement after contact effects the release of the valve 4; and the interengagement of the arm 20 and studs 10 are conditions precedent to valve release at the delivery of the desired volume of fluid.

The point of contact of the arm and clutch studs 10 as stated above is predetermined and the apparatus adjusted for operation accordingly. Provision must be made that the amount of fluid delivered after the contact is definitely and positively maintained if the device is to be accurate. During the passage of such determined amount, the arm 20, which now is fast to the cut-off shaft 22 by reason of the interengagement of its pawl 20a with the latch 21, is carried by the clutch 9 to the point where the cut-off latch 23 releases the lever 4 to close the valve. Until the arm 20 and clutch 21 are interengaged there is no operative connection between the cut-off mechanism and the dials.

In operation when the last large unit of fluid indicated on the dial 17 has been delivered, the pawl 14 has disengaged the last ratchet tooth and the stud S dropped from the periphery to the pocket of the cam 16. The purpose of the cam 16 is to hold the arm 20 in neutral position by means of the lever 19. So long as the arm 20 is in neutral position, that is, so long as the large dial is operating, the arm 20 is disengaged from the latch 21 which is fixed on and moves with the cut-off shaft 22 to which the cut-off latch 23 also is fixed. The arm 20, carried by the collar 19b, rotates about the shaft 22. When in neutral position the arm 20 is held out of engagement with the latch 21, but when the stud S has slipped into the cam pocket, the action of the spring 23a draws the arm 20 inward and the pawl 20a will engage the latch 21 when the rotation of the clutch 9 has carried the interengaged studs 10 and arm 20 to the predetermined point of contact.

The member 20a is pivoted to the clutch arm 20 as at 20b as is shown in Fig. 5, and a spring 20c serves to hold the member 20a in engagement with the latch 21. The arm 20 is recessed as at 20d to permit disengagement of the pawl and latch in dial resetting during which the arm is pushed back against the frame F'. This movement causes the member 20a to be moved out of contact with the latch 21 which is influenced by the spring 23a to cause it to return to position to hold the arm 4 when the valve is manually opened.

A spring 23a on a collar 23b on the shaft 22 normally holds the latch 23 in position to retain the valve arm 4 when the valve 1 is manually opened.

As the clutch arm 20 swings out, the latch 23 is turned, permitting the valve to close. In dial adjusting operation, the arm 20 is carried further as above described, and as it contacts the frame F', the latch 21 escapes from the member 20a permitting the catch 23 to return to position to hold the lever 4.

If it is discovered by the operator that the amount desired is less than the amount estimated, the valve 1 may be manually closed. The main dial 17 and the dial 11 may then be reset for the one-way clutch prevents reverse rotation of the shaft 8.

As my device may be found essential in different types of fluid dispensing units, I have also provided means permitting adjustment to the different locational requirements. The member 1a is slotted to permit the members 3 and 4 to be positioned as conditions require.

I may further use a safety device so that if the device becomes inoperative it will not destroy meter efficiency or permit the meter or the automatic cut-off to be damaged. The device consists of a very soft metal pin 24 holding the gear 25 on the driving shaft 5, which gear is to mesh with a gear on the meter driving shaft (not shown) of such strength that if more than usual strain is placed thereon, it will shear off avoiding the danger of strain on either my automatic cut-off or the meter.

It is thus apparent that my device permits the delivery of a predetermined amount of fluid and at the same time permits manual control, and, because of the clutch, the dial may be reset without considering the undelivered amount, and without straining my device or affecting the meter.

Various changes and modifications may be made in my invention without departing from the spirit thereof if within the limits of the appended claims.

What I therefore claim and desire to secure by Letters Patent is:

1. In a device adapted to release a valve after the passage of a predetermined quantity of fluid through a metered system, a dial, a second dial, means for establishing a ratio of rotation between said dials, a valve release, valve release operating mechanism, a cam carried by said first dial engageable with said mechanism to hold said valve open while a predetermined volume of fluid passes through the meter, and upon the passage of such fluid releasing said mechanism to operative position, a clutch rotatable with said second dial, each revolution thereof indicating the passage of certain units of fluid, said clutch at a predetermined point in its rotation cooperating with said release mechanism to release the valve on completed delivery of the fluid.

2. In a device adapted to release a valve after the passage of a predetermined quantity of fluid through a metered system, a meter driven rotatable shaft, a dial rotatable on said shaft, a second dial rotatable with the shaft, means for establishing a ratio of rotation between said dials, a valve release, valve release operating mechanism, a cam carried by said first dial, said valve release mechanism including a member engageable with said cam during the rotation of said first dial to hold said valve open while a predetermined volume of fluid passes through the meter, and upon the passage of such fluid releasing said mechanism to operative position, said valve release including a rotatable shaft, a collar rotatable on said shaft including a laterally extending arm, interlocking means between said shaft and arm, a clutch rotatable with said second dial engageable with said arm at a predetermined point in its rotation, whereby on further rotation of said clutch, said arm is carried to shaft interlocking position and said shaft to valve releasing position.

3. In a device adapted to release a valve after the passage of a predetermined quantity of fluid through a metered system, a meter driven rotatable shaft, a dial rotatable on said shaft, a second dial rotatable with the shaft, means for establishing a ratio of rotation between said dials including a ratchet movable with said first dial, a cam on each predetermined movement of said shaft actuating said lever whereby said pawl moves said ratchet dial through the space of one ratchet tooth, a valve release, valve release operating mechanism, and a member carried by said first dial holding said release mechanism in valve closing position during the rotation of said dial, and means controlled by said second dial for closing said valve on the passage of said predetermined amount of fluid.

4. In a device adapted to release a valve after the passage of a predetermined quantity of fluid through a metered system, a one way clutch rotated by the meter, a cam and a dial, members actuating said cam and said dial in predetermined relation to each revolution of said clutch, a valve release, and means to effect said valve release, said means being held in inoperative position by said cam until an amount of fluid remains to be delivered represented by a partial revolution of said clutch, said clutch including portions adapted to coact at a predetermined point with said means to release said valve at completed delivery as determined by said clutch.

5. In a device adapted to release a valve after the passage of a predetermined quantity of fluid through a metered system, a member rotated by said meter, a valve release, valve release operating mechanism including an arm, said member having portions adapted to engage said arm to release the valve on predetermined rotation of said member, a dial adjustable to the desired amount of fluid, means actuating said dial in timed relation to each revolution of said member, a cam carried by said dial, said cam preventing coaction of said member and arm and being adapted to prevent said arm to move into position to be engaged by said member when an amount of fluid remains to be delivered less than that represented by predetermined partial rotation of said member.

6. In a device adapted to release a valve after the passage of a predetermined quantity of fluid through a metered system, a valve release, valve release operating mechanism, a meter driven shaft, a primary valve release control means rotatable on said shaft and including a cam adapted to hold said release mechanism in inoperative position during a predetermined rotation thereof and releasing said mechanism to operative position at the end of said predetermined rotation, a secondary valve release control means including a clutch fixed on said shaft and rotatable therewith during the passage of the entire predetermined volume of fluid through the meter and effective after the release of said valve release operating mechanism by said first control to coact with said release operating mechanism to actuate said valve release, means for rotating said controls in timed relation to each other, connections between said release mechanism and said cam including an arm adapted to ride on the periphery of the cam during rotation thereof and to be released therefrom on termination of said rotation, connections between said release mechanism and said clutch including an arm adapted to be engaged by said clutch during its rotation after release of said mechanism to operative position by said cam and to be moved by said clutch to valve release position when said predetermined amount of fluid has passed through the meter.

7. In an automatic meter controlled valve shut-off, a meter driven shaft, a member loosely mounted on said shaft and adapted to be interlocked thereto when said shaft is rotated, a dial, a ratchet between said member and said dial for intermittently actuating said dial whereby said dial serves as a counter for predetermined movements of said member, a valve trip, means including said member for actuating said trip and means including said dial adapted to prevent said first named means from operating until an amount of fluid remains to be delivered less than that represented by said predetermined movement of said member.

8. In an automatic meter controlled shut-off for valves, a meter driven shaft, a dial, means connecting said dial to said shaft when said shaft is rotated by said meter, a second dial, a ratchet between said dials for intermittently actuating said second dial whereby said second dial serves as a counter for predetermined movements of said first dial, a valve trip, means including said first dial for actuating said trip, a member including said second dial for holding said trip out of contact with said first dial and shaft connecting means until an amount of fluid remains to be delivered less than that represented by said predetermined movement of said first dial, and means adapted to independently adjust said dials.

9. In an automatic meter controlled shut-off for valves, a meter driven shaft, a dial, means connecting said dial to said shaft when said shaft is rotated by said meter, a second dial, a ratchet between said dials for intermittently actuating said second dial whereby said second dial serves as a counter for predetermined movements of said first dial, a valve trip, means including said first dial for actuating said trip, a member including said second dial for holding said trip out of contact with said first dial and shaft connecting means until an amount of fluid remains to be delivered less than that represented by said predetermined movement of said first dial, and means adapted to independently adjust said dials, said means including shafts to each of said dials adapted to be manually rotated to give desired dial readings.

PHILIP H. ROBERTS.